(12) United States Patent
Li et al.

(10) Patent No.: US 8,910,112 B2
(45) Date of Patent: Dec. 9, 2014

(54) EXTENDED ENTERPRISE CONNECTOR FRAMEWORK USING DIRECT WEB REMOTING (DWR)

(75) Inventors: Yinghui Li, Shanghai (CN); Youneng Xiao, Shanghai (CN); Tao Liu, Shanghai (CN)

(73) Assignee: SAP AG, Walldorf (DE)

( * ) Notice: Subject to any disclaimer, the term of this patent is extended or adjusted under 35 U.S.C. 154(b) by 1312 days.

(21) Appl. No.: 12/182,999

(22) Filed: Jul. 30, 2008

(65) Prior Publication Data

US 2010/0031233 A1    Feb. 4, 2010

(51) Int. Cl.
G06F 9/44    (2006.01)
G06F 9/54    (2006.01)

(52) U.S. Cl.
CPC . G06F 8/36 (2013.01); G06F 9/541 (2013.01)
USPC ........... 717/106; 717/101; 709/227; 715/234; 719/330

(58) Field of Classification Search
CPC ................................. G06F 9/541; G06F 17/21
USPC ......................................................... 717/106
See application file for complete search history.

(56) References Cited

U.S. PATENT DOCUMENTS

| | | | |
|---|---|---|---|
| 6,484,310 B1 * | 11/2002 | Przybylski et al. | 717/101 |
| 6,836,780 B1 * | 12/2004 | Opitz et al. | 1/1 |
| 2004/0083292 A1 * | 4/2004 | Lueckhoff et al. | 709/227 |
| 2004/0158843 A1 * | 8/2004 | Cloccarelli | 719/330 |
| 2006/0150197 A1 * | 7/2006 | Werner | 719/316 |
| 2009/0031401 A1 * | 1/2009 | Cudich et al. | 726/4 |
| 2009/0204885 A1 * | 8/2009 | Ellsworth et al. | 715/234 |

OTHER PUBLICATIONS

Schutta, Nathaniel T., and Ryan Asleson. "Java-Specific Frameworks." Pro Ajax and Java™ Frameworks (2006): 117-150.*
Schutta, Nathaniel T., and Ryan Asleson. "Java-Specific Frameworks." Pro Ajax and Java TM Frameworks (2006): 117-150.*
"SAP Enterprise Connector," SAP AG., downloaded from http://help.sap.com/saphelp_nw04s/helpdata/en/ed/897483ea5011d6b2e800508b6b8a93/frameset.htm, Jul. 30, 2008.

* cited by examiner

*Primary Examiner* — Wei Zhen
*Assistant Examiner* — Mohammed Huda
(74) *Attorney, Agent, or Firm* — Blakely, Sokoloff, Taylor & Zafman

(57) ABSTRACT

Techniques for extended enterprise connector framework are described herein. According to one embodiment, a Java proxy is generated in a form of Java beans at a Web server as a mid-layer, using an enterprise connector. The enterprise connector provides object oriented classes that encapsulate specific function calls of a Java connector which represents a set of proprietary APIs (application programming interfaces) to access RFC modules of a backend enterprise system. A JavaScript proxy is generated for a frontend client that communicates with the Web server over the Web using a DWR (direct Web remoting) mechanism to allow the JavaScript proxy to directly access the Java proxy of the mid-layer via an AJAX (asynchronous Java and extensible markup language or XML) communication mechanism, where the JavaScript is invoked by a Web application of the frontend client at runtime. Other methods and apparatuses are also described.

15 Claims, 13 Drawing Sheets

500

Create a Java Proxy and corresponding Java Beans for a mid-layer of a server side, using an enterprise connector (e.g., SAP Enterprise Connector), which encapsulates function calls of Java connector (SAP Java Connector or JCo) to certain RFC function modules of a backend system (e.g., SAP R/3 system).
501

↓

Enable and configure DWR to wrap the Java beans created by the enterprise connector, including converting methods of the Java beans to a Java script used by a front end, in order to allow the front end to access methods of the Java beans via AJAX calls through DWR.
502

↓

Develop a Web page running at the front end to invoke via DWR the methods of the Java beans of the mid-layer on the server side, which in turn accesses the RFC function modules of the backend via the enterprise connector where the enterprise connector calls the RFC functions via Java connector API.
503

FIG. 5

```
public Task_PortType () {
    super(staticDescriptor, staticGenerationInfo,
    com.sap.aii.proxy.framework.core.FactoryConstants.CONNECTION_TYPE_JCO);

// add the following 3 lines to add a connection to the proxy.
Client client = JCO.createClient("client", "username", "password", "language", "host", "systemnumber");
    client.connect();
    messageSpecifier.setJcoClient(client);
}
```

FIG. 6A

```
<servlet>
    <servlet-name>dwr-invoker</servlet-name>
    <servlet-class>
        org.directwebremoting.servlet.DwrServlet
    </servlet-class>
</servlet>
<servlet-mapping>
    <servlet-name>dwr-invoker</servlet-name>
    <url-pattern>/dwr/*</url-pattern>
</servlet-mapping>
```

```xml
<?xml version="1.0" encoding="UTF-8"?>
<!DOCTYPE dwr PUBLIC "-//GetAhead Limited//DTD Direct Web Remoting 1.0//EN" "http://www.getahead.ltd.uk/dwr/dwr10.dtd">

<dwr>
  <allow>
    <create creator="new" javascript="Task">
      <param name="class"
        value="com.sap.bpr.dwrdemo.task.Task_PortType" />
    </create>

<convert converter="bean"
      match="com.sap.bpr.dwrdemo.task.*" />
  </allow>
</dwr>
```

FIG. 6D

```html
<!-- These are dwr engine library and utility library. -->
<script type="text/javascript" src="dwr/engine.js"></script>
<script type="text/javascript" src="dwr/util.js"></script>

<!-- This is the java proxy generated at runtime. -->
<script type="text/javascript" src="dwr/interface/Task.js"></script>

<!-- Put our own javascript in this file. -->
<script type="text/javascript" src="TaskMgnt.js"></script>
```

```
// Set the input parameter, provide a callback function and call the proxy's method.
function queryTask()
{
    var query = {
        iv_Page_Id: $('pageId').value,
        iv_Content_Id: $('contentId').value
    };

Task.op_Query_Task(query, displayTasks);
}
```

FIG. 6E

```
// Get the return tasks from the return data and display it on the web page.
function displayTasks(data) {
        var table = "<table border=1> <tr><th>Task ID</th><th>Task Title</th><th>Description</th><th>Duration Date</th><th>Agents</th></tr>";
        var tasks = data.et_Tasks;

for (var i = 0; i < tasks.length; i++) {
                var line = "<tr>";

line += "<td>" + tasks[i].id + "</td>";
                line += "<td>" + tasks[i].title + "</td>";
                line += "<td>" + tasks[i].description + "</td>";
                line += "<td>" + tasks[i].due_Date + "</td>";

var agents = tasks[i].agents;
                var agentsStr = "";

if (agents != null && agents.length != null && agents.length != 0) {
                        for (var j = 0; j < agents.length; j++) {
                                if (j == agents.length - 1) {
                                        agentsStr += agents[j]
                                } else {
                                        agentsStr += agents[j] + ", ";
                                }
                        }
                } line += "<td>" + agentsStr + "</td>";
                table += line;
        } table += "</table>";
        document.getElementById("result").innerHTML = table;
}
```

FIG. 6F

```html
<!DOCTYPE HTML PUBLIC "-//W3C//DTD HTML 4.01//EN" "http://www.w3.org/TR/html4/strict.dtd">
<html>
<head>
<meta http-equiv="Content-Type" content="text/html; charset=UTF-8">
<meta http-equiv="Pragma" content="no-cache">
<meta http-equiv="expires" content="0">

<title>Query Task</title>

<script type="text/javascript" src="dwr/interface/Task.js"></script>
<script type="text/javascript" src="TaskMgnt.js"></script>

<script type="text/javascript" src="dwr/engine.js"></script>
<script type="text/javascript" src="dwr/util.js"></script>

</head>
<body>
<h1>Query Task Using <font color=red>DWR</font> and <font color=red>SAP Enterprise Connector</font></h1>

<table>
    <tr>
        <td>Page Id:</td>
        <td><input id="pageId" type="text" value="0010"></td>
    </tr>
    <tr>
        <td>Content Id:</td>
        <td><input id="contentId" type="text" value="P0010/T00065"></td>
    </tr>
    <tr>
        <td><input type='button' value='Search' onclick="queryTask();"></td>
        <td><input type="button" value="Clear" onclick="document.getElementById('result').innerHTML = '';"></td>
    </tr>
</table>

<div id="result"></div>

</body>
</html>
```

FIG. 6G

EXTENDED ENTERPRISE CONNECTOR FRAMEWORK USING DIRECT WEB REMOTING (DWR)

FIELD OF THE INVENTION

The present invention relates generally to programming framework for enterprise backend systems. More particularly, this invention relates to extended enterprise connector framework for enterprise backend systems.

BACKGROUND

In modern Web application development architecture, Web 2.0 technology is getting more popular and used to provide an end user with rich functionality and better user experience. As the most important part of Web 2.0, AJAX (Asynchronous JavaScript and XML) plays as a data converting and transferring center which bridges a browser and a server in an asynchronous way.

AJAX is a technology for developing and delivering the rich UI (user interface) over the Internet that has become increasingly popular. Specifically, AJAX is a client side technology that enables a UI event to propagate to the server at a more granular level compared to the document data model. Under this technical trend, traditional 3-layer Web application development architecture has certain drawbacks. For an AJAX enabled Web application, a lot of work is spent on data converting and transferring jobs between a browser, a server, and a backend system. This also makes subsequent extension and maintenance work very complicated and time consuming.

FIG. 1 is a block diagram illustrating a typical AJAX programming model. In this example, a frontend as a Web presentation layer includes an AJAX engine which communicates with a J2EE (Java 2 enterprise edition) engine as a mid-layer in an asynchronous manner. The mid-layer includes an enterprise connector or Java connector API (application programming interface) that handles specific function calls to certain RFC (remote function call) function module of a backend system.

FIGS. 2A-2B are block diagrams illustrating certain communications configurations between a mid-layer and a backend. As shown in FIG. 2A, communications between a mid-layer and a backend can be performed via a set of Java connection API (e.g., SAP Java connector or JCo). The Java connector such as SAP JCo is a toolkit that allows a Java application to communicate with a backend system. In addition, as shown in FIG. 2B, communications between a mid-layer and the backend can be performed using a Java proxy via an enterprise connector such as SAP enterprise connector. The enterprise connector is a development tool that provides help classes and RFC function module method calls for Java applications. These method calls and help classes are referred to as a Java proxy.

In order to use the functionality of AJAX engine, a user has to handle all AJAX specific calls which are fairly complicated. DWR (direct Web remoting) is a Java open source library which allows a user to develop AJAX Web sites. DWR works by dynamically generating JavaScript based on Java classes. The code does some AJAX magic to make it feel like the execution is happening on the client, but in reality the server is executing the code and DWR is marshalling the data back and forwards.

However, in order to use DWR to communicate with an enterprise backend system, significant amount of data conversion between the frontend and backend must be performed, which is sometimes tedious.

SUMMARY OF THE DESCRIPTION

Techniques for extended enterprise connector framework are described herein. According to one embodiment, a Java proxy is generated in a form of Java beans at a Web server as a mid-layer, using an enterprise connector. The enterprise connector provides object oriented classes that encapsulate specific function calls of a Java connector which represents a set of proprietary APIs (application programming interfaces) to access RFC modules of a backend enterprise system. A JavaScript proxy is generated for a frontend client that communicates with the Web server over the Web using a DWR (direct Web remoting) mechanism to allow the JavaScript proxy to directly access the Java proxy of the mid-layer via an AJAX (asynchronous Java and extensible markup language or XML) communication mechanism, where the JavaScript is invoked by a Web application of the frontend client at runtime.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 5 is a flow diagram illustrating a process of an extended enterprise connector framework according to one embodiment of the invention.

FIGS. 6A-6G are pseudo code illustrating an example of application development using an extended enterprise connector framework according to one embodiment of the invention.

DETAILED DESCRIPTION

Techniques for extended enterprise connector framework are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a new model referred to herein as an extended enterprise connector (XEC) is utilized. The XEC is based on an enterprise connector (EC) such as the enterprise connector framework available from SAP AG. The extended enterprise connector is developed by extending the EC using direct Web remoting (DWR) as its AJAX engine. Compared to the traditional architecture, the extended enterprise connector framework or model greatly reduces developers' effort spent on data converting and transferring, and provides a fast and rapid development model, a clear role, and responsibility division for developer or developers. The extended EC is very easy to extend and maintain. Note that throughout this application, for the purposes of illustration only, SAP enterprise connector, SAP Java connector (JCo), and SAP backend functions ABAP are used as examples of enterprise connector, Java connector, and backend function modules; however, other connectors or functions may also be applied.

Figure 1:
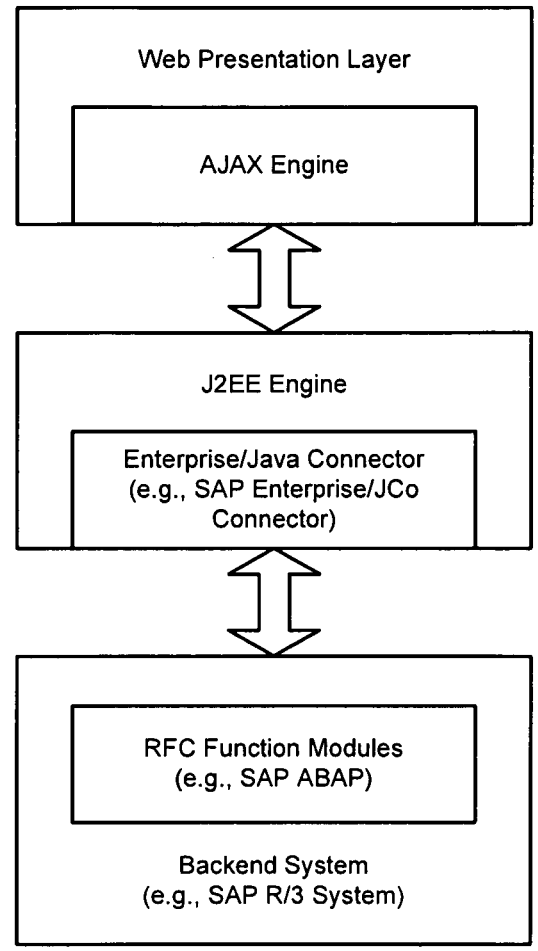
FIG. 1 is a block diagram illustrating a typical AJAX programming model.
Figure 2B:
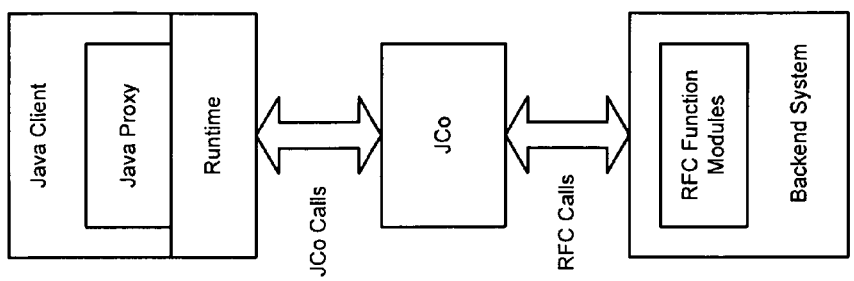
FIGS. 2A-2B are block diagrams illustrating certain communications configurations between a mid-layer and a backend.
Figure 2A:
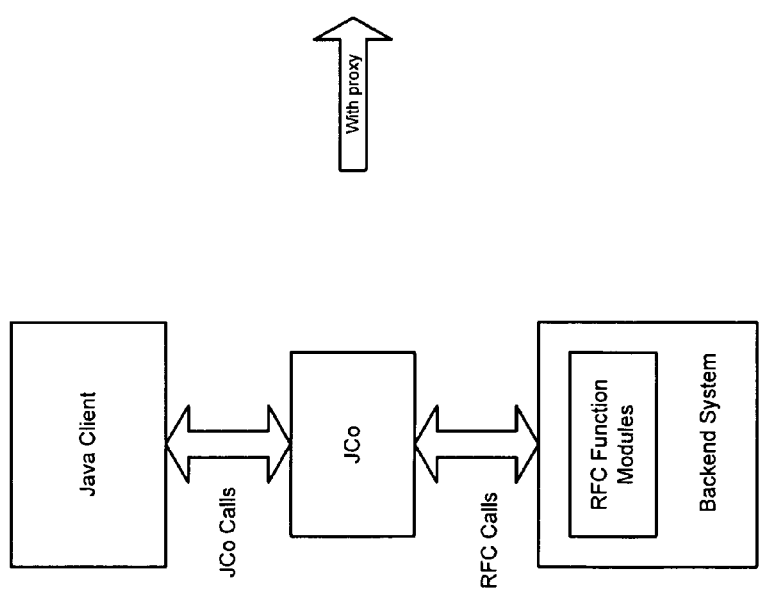
Figure 3:
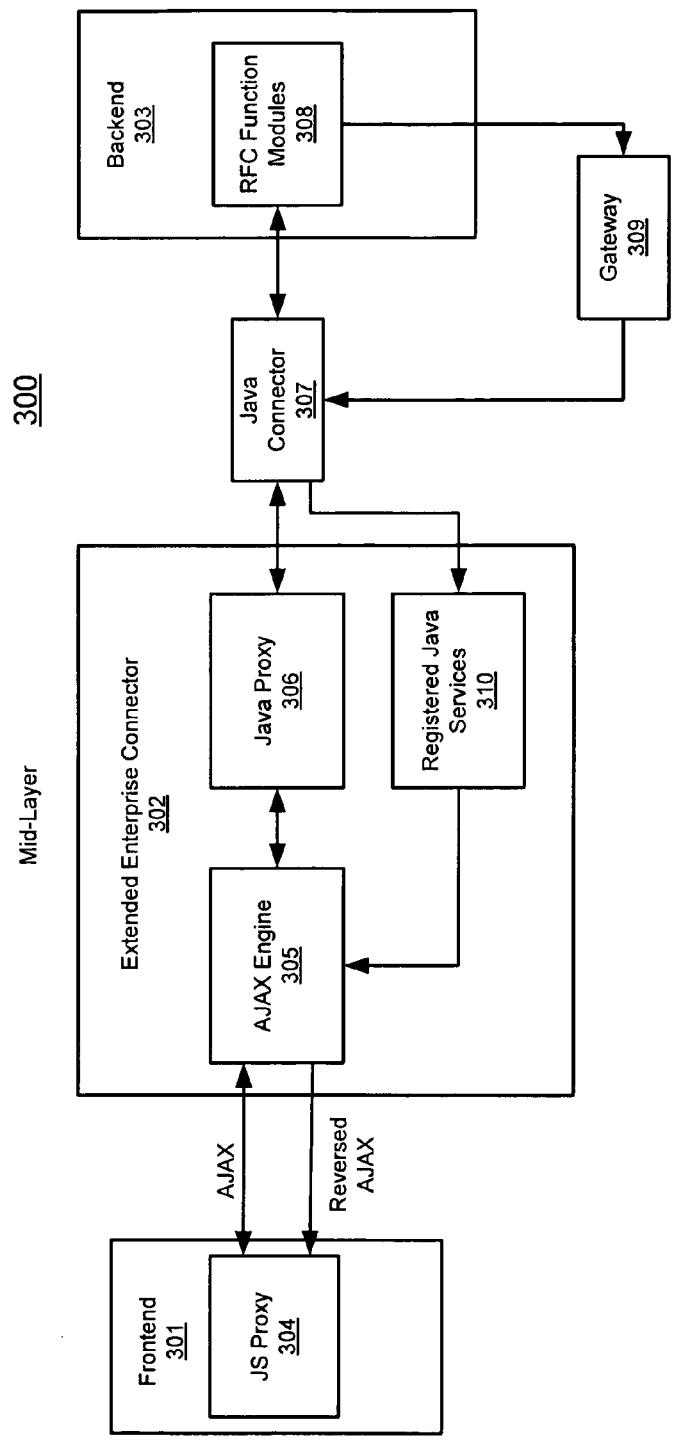
FIG. 3 is a block diagram illustrating an example of an extended enterprise connector framework according to one embodiment of the invention.

FIG. 3 is a block diagram illustrating an example of an extended enterprise connector framework according to one embodiment of the invention. Referring to FIG. 3, framework 300 includes, but is not limited to, a frontend 301, a mid-layer 302, and a backend 303 communicatively coupled to one another. In this example, mid layer 302 is also referred to as part of extended enterprise connector (XEC), which is based on a basic enterprise connector (EC). In the XEC 302, a frontend support is added to an existing EC. It not only supports Java (e.g., Java proxy 306 of mid-layer 302) to function modules 308 (e.g., ABAP) of backend 303 communications, but also enables the communications between JavaScript 304 of frontend 301 and the XEC 302 as a mid-layer. In addition, according to one embodiment, it also enables direct communications between frontend 301 to backend 303.

Java proxy 306 is generated as part of EC which encapsulates specific function calls of Java connector 307. The AJAX engine 305 performs the similar operations with the EC, but between JavaScript 304 of frontend 301 and Java proxy 306 of mid-layer 302.

According to one embodiment, AJAX engine 305 is configured to perform automatic data conversion between JavaScript 304 and Java (e.g. Java proxy) based on the Java code generated by the EC, which wraps around the communication protocols of Java connector 307. The AJAX engine 305 is also configured to wrap the AJAX calling and/or returning mechanism. In addition, by using reverse AJAX techniques, the mid-layer 302 can call functions of JavaScript 304 directly.

Furthermore, Java connector 307 allows the backend function modules 308 to call the registered Java side code 310 through a gateway 309. By using this functionality and reverse AJAX technology of AJAX engine 305 (e.g., via DWR) together, the function modules 308 can call the JavaScript functions 304 of frontend 301.

Since AJAX engine 305 does the similar work with the EC but between the JavaScript 304 of frontend 301 and Java 306 of mid-layer 302, this can greatly simplify the frontend 301 and mid-layer 302 wrapping work and enable a fast and rapid prototyping model. Using DWR's reverse AJAX and EC's backend calling Java technology can also enable Java 306 to JavaScript 304 and backend functions 308 to JavaScript 304 calling. Note that some or all of the components as shown in FIG. 3 may be implemented as software, hardware, or a combination of both.

Figure 4:
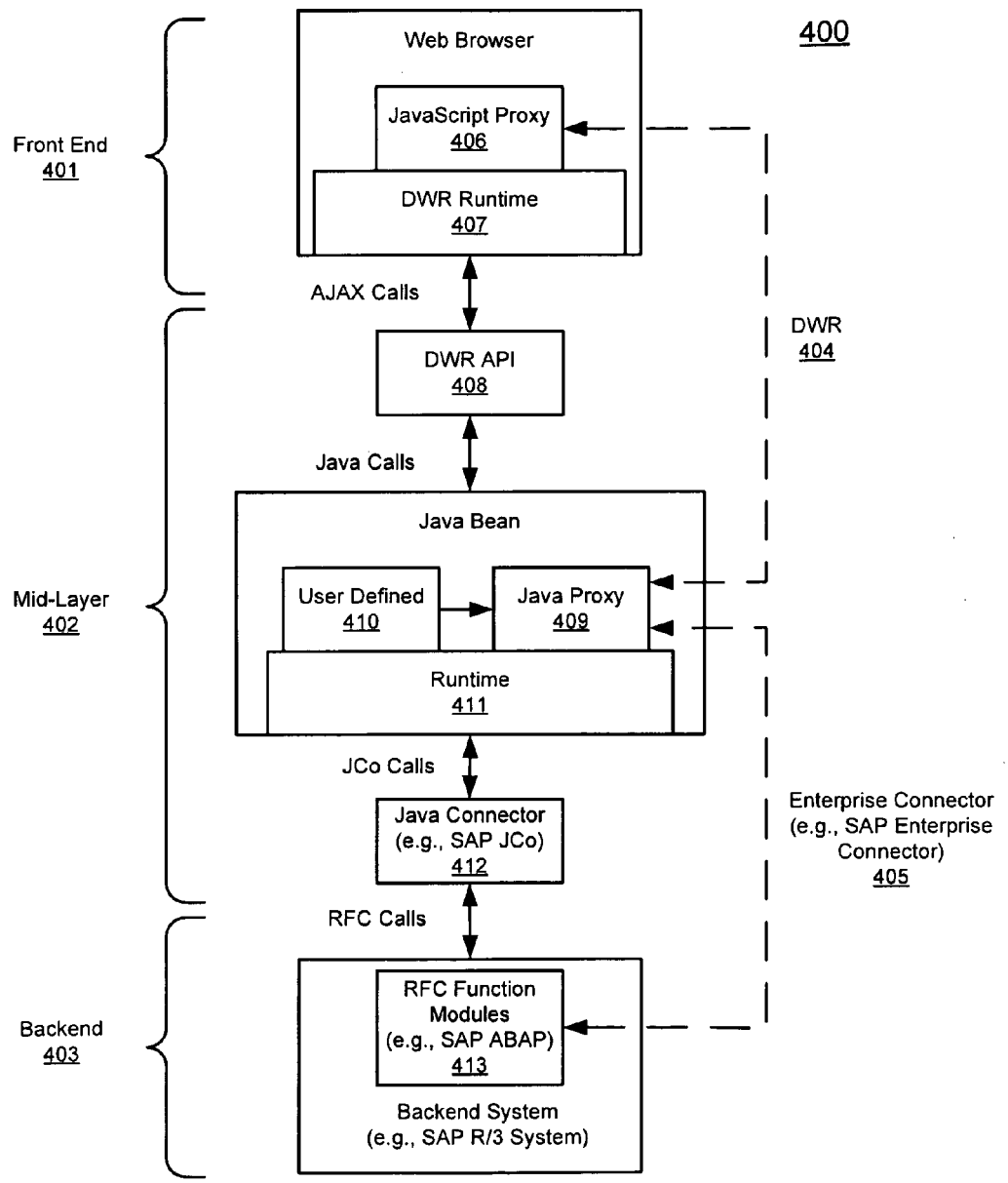
FIG. 4 is a block diagram illustrating development framework architecture according to one embodiment of the invention.

FIG. 4 is a block diagram illustrating development framework architecture according to one embodiment of the invention. For example, architecture 400 may be implemented as part of system 300 of FIG. 3. Referring to FIG. 4, similar to system 300 of FIG. 3, framework 400 includes a frontend 401, a mid-layer 402, and a backend 403. Framework 400 utilizes DWR and EC together as solution (e.g., extended EC or XEC as part of mid-layer 402) to provide a client side developer a channel to use the backend function modules directly and greatly ease the developing effort in frontend layer 401 and mid-layer 402.

In this example, DWR is utilized to handle communications between frontend 401 and mid-layer 402 as illustrated via path 404, while EC is utilized to handle communications between mid-layer 402 and backend 403 as illustrated via path 405. Together, the DWR and EC constitute an extended EC or XEC framework.

As described above, AJAX is a group of inter-related Web development techniques used for creating interactive Web applications. A primary characteristic is the increased responsiveness of Web pages achieved by exchanging small amounts of data with the server "behind the scenes" so that entire Web pages do not have to be reloaded each time there is a need to fetch data from the server. This is intended to increase the Web page's interactivity, speed, functionality and usability.

AJAX is asynchronous, in that extra data is requested from the server and loaded in the background without interfering with the display and behavior of the existing page. JavaScript is the scripting language in which AJAX function calls are usually made. Data is retrieved using the XMLHttpRequest object that is available to scripting languages run in modern browsers, or alternatively, through the use of remote scripting in browsers that do not support XMLHttpRequest. In any case, it is not required that the asynchronous content be formatted in XML (extensible markup language).

AJAX is a cross-platform technique usable on many different operating systems, computer architectures, and Web browsers as it is based on open standards such as JavaScript and the Document Object Model (DOM). There are free and open source implementations of suitable frameworks and libraries. However, programming in AJAX requires extensive programming involved and sometimes it is tedious to an ordinary programmer.

In order to develop an AJAX enabled Web application, a client side developer has to write JavaScript with the HTML (hypertext markup language). The JavaScript typically includes the following functionalities:

JavaScript code to create and send AJAX calls.
Data conversion functions to convert data to a certain format such as XML or JSON (JavaScript object notation) which the server side Java code can understand and convert.
Callback functions to handle the return data.
Page rendering functions to updating part of the Web page using the data returned from the server.
Error handling code to deal with the HTTP errors, data conversion errors, business logic errors and other errors.

A server side developer typically writes the following Java code:

Data conversion code to convert data between client side and server side using the specific data format such as XML and JSON.

Call the backend function modules to complete the business logic which is done by using an enterprise connector such as SAP enterprise connector.

Error handling codes.

Functions to compose the return data and send it back to the client side which is done by a servlet or JSP (Java server page).

As can be seen above, client development efforts to handling AJAX calls are quite complicated.

DWR is a Java open source library which helps developers to write Web sites that include AJAX technology. It allows code in a Web browser to use Java functions running on a Web server as if those functions were within the browser. It consists of two main parts: code to allow JavaScript to retrieve data from a servlet-based Web server using AJAX principles; and a JavaScript library that makes it easier for a Web site developer to dynamically update the Web page with the retrieved data.

DWR takes a novel approach to AJAX by dynamically generating JavaScript code based on Java classes. Thus, a Web developer can use Java code from JavaScript as if it were local to the Web browser; whereas in reality the Java code runs in the Web server and has full access to Web server resources. For security reasons a Web developer must configure exactly which Java classes are safe to export.

This method of remoting functions from Java to JavaScript gives DWR users a feel much like conventional RPC (remote procedure call) mechanisms like RMI (Java remote method invocation) or SOAP (simple object access protocol), with the benefit that it runs over the Web without requiring Web browser plug-ins. DWR does not consider the Web browser/Web server protocol to be important, and prefers to ensure that the programmer's interface is natural. The greatest challenge to this is to marry the asynchronous nature of AJAX with the synchronous nature of normal Java method calls. In the asynchronous model, result data is only available some time after the initial call is made. DWR solves this problem by allowing the Web developer to specify a function to be called when the data is returned using an extra method parameter, also referred to as a callback method. Thus, by using DWR, a client development can be greatly simplified.

Referring back to FIG. 4, according to one embodiment, DWR 408 is utilized to handle AJAX communications between frontend 401 and a mid-layer 402 (e.g., enterprise connector or EC). DWR 408 automatically generates the JavaScript proxy code 406 for the server side JavaBeans (e.g., Java proxy 409) at runtime. DWR's client side JavaScript engine, via runtime module 407, automatically converts data between JavaScript 406 and Java 409. A client side programmer can directly pass the JavaScript object to the proxy 406 and get the result also as JavaScript object, which saves significant amount of development efforts on the client side. In addition, DWR 408 hides the specific details of making AJAX calls. The client side developer can focus on the specific user interface logic without having to worry about specific details of the AJAX mechanism. Further, DWR 408 can generate JavaScript (JS) proxies 406 for any standard JavaBeans. Thus, any situation which uses JavaBeans can use DWR to provide frontend accessibility (e.g., reversed AJAX).

The enterprise connector (such as SAP enterprise connector) is a development tool that provides help classes and RFC function module method calls for Java applications. These method calls and help classes are referred to herein as Java proxy 409. The Java proxy 409 hides native Java connector 412 (such as SAP Java connector or JCo) calls, which is used to communicate with backend RFC function modules 413 via RFC calls. The EC framework is designed to enable type-secure data access and to increase client application stability. The Java proxy runtime 411 also makes the handling between single-byte systems and Unicode systems transparent to a user. This means that the user does not have to convert the function parameters between single-byte characters and Unicode characters.

Java connector 412 is a toolkit that allows a Java application to communicate with a variety of backend systems such as SAP ABAP system. Java connector 412 combines an easy to use API with flexibility and performance. Java connector 412 supports both Java to backend system and the backend system to Java calls. For example, given an SAP backend system such as ABAP system, Java connector 412 may perform operations similar to a typical data flow as follows:

1. Connect to the backend system:
JCO.Client client=JCO.createClient("client", "username", "password", "language", "host", "systemnumber");
client.connect( );
2. Create a repository to store the function module meta data:
JCO.Repository rep=new JCO.Repository("RepositoryName", client);
3. Get function:
JCO.Function f_myfunc=rep.getFunctionTemplate ("functionModuleName".toUpperCase( )).getFunction( );
4. Set input parameter:
ParameterList importParams=f_myfunc.getImportParameterList( );
importParams.setValue("value", "ParameterName");
5. Execute the function module:
client.execute(f_myfunc);
6. Get the output parameter:
ParameterList exportParams=f_myfunc.getExportParameterList( );
String value=exportParams.getString("parameterName"));
7. Disconnect from the backend system:
client.disconnect( );

Enterprise connector 405 is a development tool that provides help classes and RFC function module method calls for Java applications. These method calls and help classes are referred to herein as Java proxies. The Java proxy 409 is configured to hide native calls of Java connector 412 from a Java application such as JavaScript 406. For example, given an SAP backend system such as ABAP system, enterprise connector 405 may perform operations similar to a typical data flow as follows:

1. Connect to the backend system:
JCO.Client client=JCO.createClient("client", "username", "password", "language", "host", "systemnumber");
client.connect( );
XXX_PortType xxxService=new XXX_PortType( );
xxxService.messageSpecifier.setJcoClient(client);
2. Set the input parameters:
XXXFunctionModule_Input input=new XXXFunctionModule_Input( );
input.setInputParam1(param1);
input.setInputParam2(param2);
3. Call the function module:
XXXFunctionModule_Output output=xxxService.op_XXXFunctionModule (input);
4. Get the output parameters:
String param1=output.getOutputParam1( );
String param2=output.getOutputParam2( );

5. Disconnect from the backend system:
client.disconnect( );

Since the outcome of enterprise connector 405 is in a form of standard JavaBeans, according to one embodiment, DWR can be utilized to wrap function calls of enterprise connector 405 again to allow frontend 401 to use function modules 413 of backend 403 directly and make mid-layer 402 transparent.

According to one embodiment, extended enterprise connector architecture 400 divides DWR and EC's responsibilities. For example, DWR is configured to convert data formats between JavaScript object (e.g., JavaScript proxy 406) and JavaBeans objects (e.g., Java proxy 409), to hide AJAX specific calling details, and to manage JavaBeans. On the other hand, the EC is configured to convert data formats between JavaBeans objects (e.g. Java proxy 409) and data types of backend function modules 413 and to hide Java connector 412 calling details.

As a result, a client side application can call the backend function modules directly. This makes the mid-layer transparent and allows a frontend JavaScript to communicate with the backend function modules directly. In addition, a developer can only need to write less code, for example, only several lines of a configuration file are needed. Code lines can be reduced for more than 96% and developing time can be reduced for more than 80%. Further more, framework 400 is all based on JavaBeans which are widely used, which are mature frameworks and fit most situations.

According to different mid-layer logic requirements, according to certain embodiments of the invention, the mid-layer JavaBeans can be further divided into two categories. If there is no mid-layer logic, in which all the logic is implemented in the backend system, the mid-layer is configured to perform data conversion and to forward the request to the backend system, similar to a dispatcher. In this case, DWR 408 wraps the Java proxy 406 generated by the EC directly. No other JavaBeans are needed.

From the client side developer's view, the mid-layer 402 is transparent and it is like calling the backend function modules from JavaScript proxy 406. If there is business logic that requires a mid-layer to be implemented, the business logic of mid-layer 402 may be implemented in a form of JavaBeans. JavaBeans can have there own business logic, also referred to herein as user defined logic 410, and they can also use the Java proxy 409 generated by EC. Then DWR 408 wraps these JavaBeans as well as the Java proxy generated by EC according different requirements. The client side developer can use both the JavaBeans (e.g., user-defined business logic) and the Java proxy (generated by EC). Other configurations may exist.

FIG. 5 is a flow diagram illustrating a process of an extended enterprise connector framework according to one embodiment of the invention. Note that process 500 may be performed by processing logic which may include software, hardware, or a combination of both. For example, process 500 may be performed by system 400 of FIG. 4. Referring to FIG. 5, at block 501, processing logic creates, using an enterprise connector framework (e.g., SAP Enterprise Connector), a Java proxy and the corresponding Java beans for a mid-layer of a server side, where the enterprise connector framework encapsulates the function calls of a Java connector (e.g., SAP JCo) to certain RFC function modules of a backend layer (e.g., SAP ABAP system). At block 502, processing logic enables and configures DWR to wrap the Java beans and/or the Java proxy created by the enterprise connector. In one embodiment, DWR is configured to convert methods of the Java beans and the Java proxy to a Java script used by a frontend, in order to allow the frontend to access methods of the Java beans via AJAX calls through DWR mechanism. At block 503, a Web page can then be developed running at the frontend which will invokes via the DWR the methods of the Java beans and/or Java proxy of the mid-layer on the server side. The Java proxy and/or Java beans in turn call the RFC function modules of a backend system via the enterprise connector framework which invokes the Java connector API. Other operations may also be performed.

FIGS. 6A-6G are pseudo code illustrating an example of application development using an extended enterprise connector framework according to one embodiment of the invention. The first operation is to create a Java proxy using an enterprise connector (e.g., SAP enterprise connector). During this operation, system connection information and the function group name are provided and the function modules are selected that a user wants to generate proxies. In this example, for the purpose of illustration, a backend function module named "Op_Query_Task" is selected and a name for the proxy, for example "Task" is provided, which in turn creates a main class for the proxy having a name of "Task_PortType" as shown in FIG. 6A, where the constructor is modified to add a connection to the Java proxy.

Next, DWR is utilized to wrap the Java beans created above. For example, the open source DWR libraries can be downloaded from a well-known source such as getahead.org/dwr. In addition, in order to invoke DWR, a user has to declare in a client side initialization file, such as web.xml file, a Java servlet that DWR uses, as shown in FIG. 6B.

Further, a DWR configuration file is created as shown in FIG. 6C. Referring to FIG. 6C, the "create" tag tells the DWR to create the specified JavaBeans of "Task_PortType" and convert all its methods to JavaScript proxy with JavaScript file name "Task.js". The "convert" tag instructs the DWR which JavaBeans need be converted to JavaScript data format as a function's parameters.

In this example, the XML states that the client-side JavaScript can use Java class "Task_PortType" remotely, which has been or will be created by the enterprise connector as described above. The JavaScript object binds the client-side code remotely to the Java class "Task_PortType." The XML binds JavaScript "Task" to Java object "Task_PortType," such that the Java object is available to be used in the client-side JavaScript. This means that JavaScript code can call all the public methods of the Java object. Now the server side configuration has been completed.

On the client side, the Web page that calls the server side JavaBeans methods has to include certain declarations as shown in FIG. 6D, in order to allow client side JavaScript to remotely access server side Java objects via DWR. In addition, in the JavaScript file "TaskMgnt.js," JavaScript code can be written to call the JavaBeans methods on the server side as shown in FIG. 6E. In this example, function "queryTask" calls the server side function "Task.op_Query_Task," where "op_Query_Task" is the targeted RFC function of the backend system. In addition, when invoking DWR, a callback function is provided as a parameter to allow DWR to call back as part of AJAX protocol when the operations have been completed. Here in this example, a callback function "displayTasks" is provided when invoking "Task.op_Query_Task." An example of callback function "displayTasks" is shown in FIG. 6F. Now function "queryTask" can be called from the main Web page, as shown in FIG. 6G.

Figure 7A:
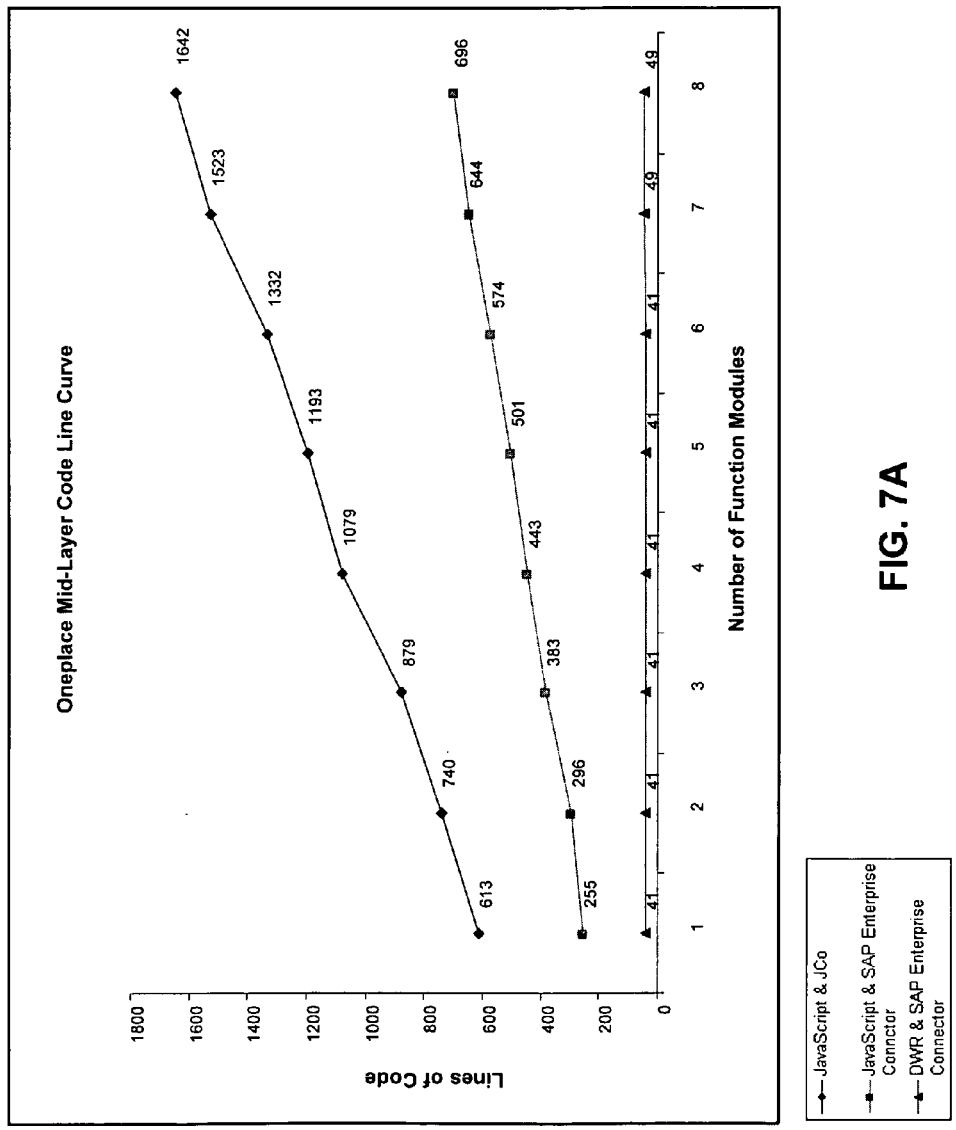
FIGS. 7A-7B are line diagrams illustrating certain statistics of using an embodiment of an extended enterprise connector framework in view of certain conventional methods.
Figure 7B:
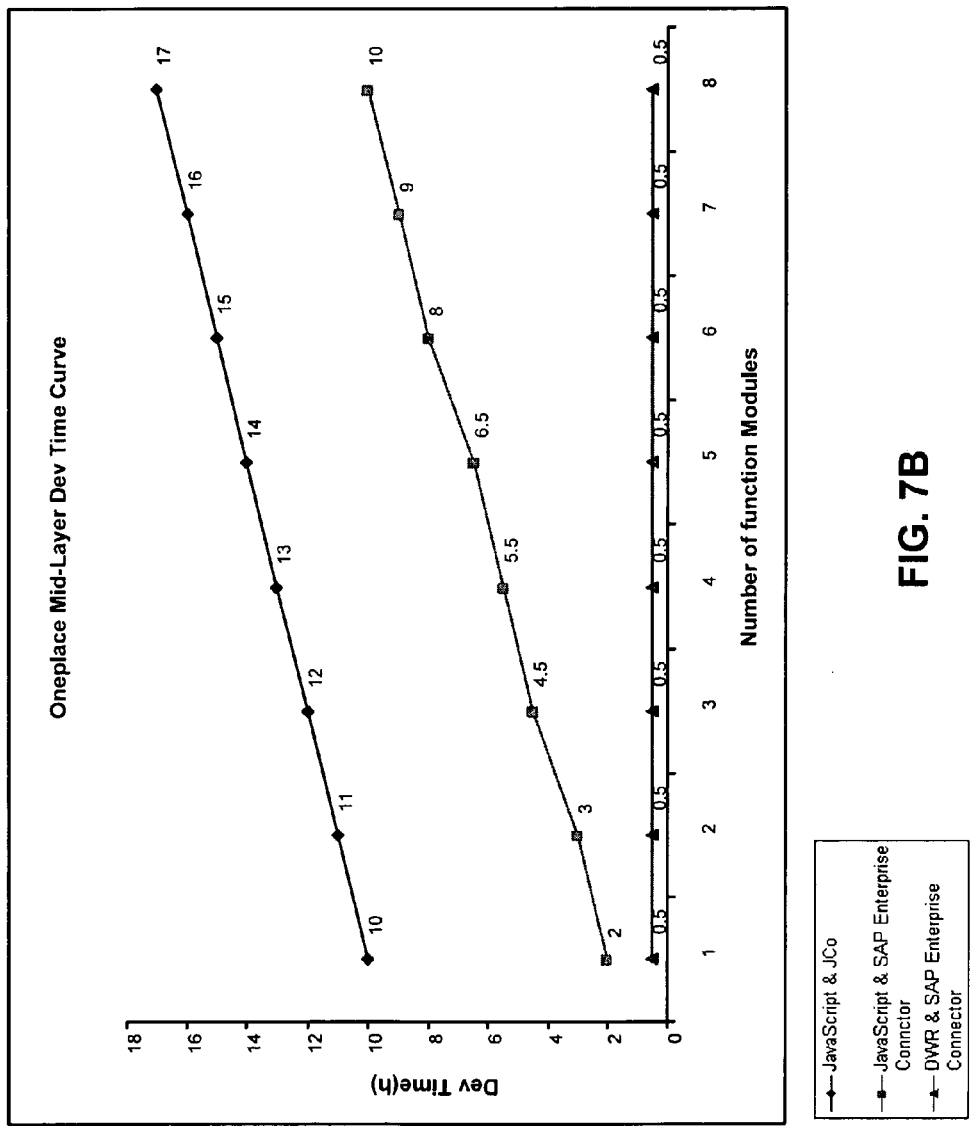

From the above example code as shown in FIGS. 6A-6G, to call the backend function modules, one just needs do some simple configuration and then can call the JavaScript proxy as it were using the function modules in the backend system. The calling is performed through AJAX and the result is returned and displayed in an asynchronous way without refreshing the entire page. As a result, significantly amount of coding efforts and development time can be saved as shown in FIGS. 7A-7B.

Figure 8:
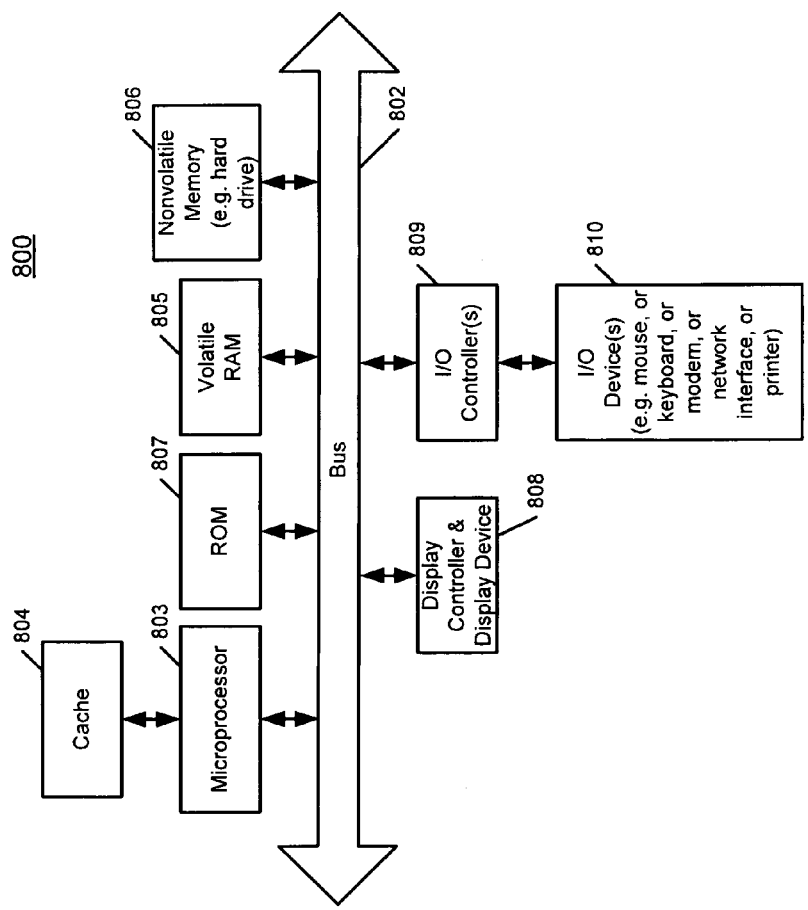
FIG. 8 is a block diagram of a data processing system, which may be used with one embodiment of the invention.

FIG. 8 is a block diagram of a data processing system, which may be used with one embodiment of the invention. For example, the system 800 shown in FIG. 8 may be used as a client, a server, or a backend system. Note that while FIG. 8 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention.

As shown in FIG. 8, the computer system 800, which is a form of a data processing system, includes a bus or interconnect 802 which is coupled to one or more microprocessors 803 and a ROM 807, a volatile RAM 805, and a non-volatile memory 806. The microprocessor 803 is coupled to cache memory 804. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 8 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Thus, techniques for extended enterprise connector framework have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A development framework for developing a Java application for an enterprise system, the development framework comprising:
    servers, each server having a memory for storing instructions and a processor to perform instructions, the servers including:
    a backend having a set of RFC (remote function call) modules in memory for the processor to access resources of a backend enterprise system;
    an enterprise connector in communication with the backend, the enterprise connector having in memory an AJAX (asynchronous Java and extensible markup language or XML) engine, wherein the enterprise connector processor encapsulates a set of Java connector APIs (application programming interfaces) to the RFC modules of the backend, and wherein the enterprise connector processor generates a Java proxy in a form of Java beans for accessing the RFC modules via the Java connector APIs, including converting between:

data formats of the Java beans and data types of the RFC modules;

a frontend in communication with the enterprise connector, the frontend having in memory a Web application including a JavaScript proxy, the frontend processor to directly access the Java proxy via the AJAX engine using an AJAX compatible communication scheme, wherein the JavaScript proxy is connected to the AJAX engine via a DWR (direct Web remoting) mechanism, the DWR mechanism operating in conjunction with a DWR configuration file having a create tag and one or more convert tags, the create and convert tags instructing the DWR mechanism to:

cause the enterprise connector to create the Java beans for the Java proxy, convert between JavaScript data format and Java beans data format, and convert between JavaScript file names and Java beans methods; and wherein the memory and processors of the servers of the development framework are further to store and perform instructions to:

receive a selection of an RFC module for which the Java script proxy and Java proxy are to be generated using the DWR mechanism, generate the DWR configuration file for the DWR mechanism, the DWR configuration to specify the Java beans in the selected RFC module for which the Java script proxy and Java proxy are to be generated using the DWR mechanism, and automatically convert frontend data received from the Java script proxy to backend data for the Java proxy to use when accessing the RFC modules via the Java connector APIs, using the converting capabilities of the enterprise connector and the frontend DWR mechanism in accordance with the generated DWR configuration file.

2. The development framework of claim 1, wherein the JavaScript proxy is dynamically generated by the DWR mechanism in accordance with the DWR configuration file, based on the Java proxy generated by the enterprise connector.

3. The development framework of claim 2, wherein the DWR mechanism is configured in accordance with the DWR configuration file to invoke the AJAX engine to transmit the converted data and dynamically encapsulate a specific calling convention of the AJAX engine.

4. A computer-implemented method performed in an enterprise connector to facilitate communications between a frontend layer and a backend layer of an enterprise computing system, the method comprising:

creating a Java proxy in the enterprise connector, the Java proxy facilitating a Java connector interface between the enterprise connector and the backend layer, the Java proxy containing a frontend method for a remote function call (RFC) to a backend function module;

wrapping the frontend method for the RFC for invocation by a Java script proxy for a Java script running in the frontend layer via direct communication between the Java script proxy and the Java proxy using direct web remoting (DWR) configured to support wrapping in accordance with a DWR configuration file, the DWR configuration file having a create tag and one or more convert tags, the create and convert tags instructing the DWR mechanism to:

cause the enterprise connector to create Java beans for the Java proxy, convert methods of the Java beans to Java Script proxy using Java Script file names, convert Java beans objects to Java Script data format as function parameters of the JavaScript proxy; and responsive to an invocation of the frontend method for the RFC by the Java script proxy using the Java script file names and function parameters, performing, in the enterprise connector:

generating the DWR configuration file for the RFC for which the frontend method was invoked, the DWR configuration file to specify the Java beans in the RFC for which the Java script proxy and Java proxy are to be generated using the DWR mechanism, and converting frontend data received by the Java proxy from the JavaScript proxy from Java beans data format to backend data formatted in accordance with the DWR configuration file, DWR mechanism and backend function module data types, and initiating, via the Java proxy, the RFC to the backend function module on the backend layer using the converted backend data without exposing the Java connector interface to the frontend layer.

5. The method of claim 4, wherein wrapping the frontend method for the RFC is performed using Asynchronous JavaScript and Extended Markup Language (AJAX).

6. The method of claim 4, wherein responsive to the invocation of the frontend method, the method further comprises:

responsive to the backend layer initiating a return to the Java proxy from the RFC to the backend function module performing, in the enterprise connector, converting backend data returned from the backend function module formatted in accordance with backend function module data types to Java proxy data format; and relaying the converted data in Java proxy data format from the Java proxy to the Java script proxy.

7. The method of claim 6, wherein relaying the converted data in Java proxy data format from the Java proxy to the Java script proxy in Java script proxy format is performed using a reverse AJAX engine and DWR mechanism to manage converting the Java beans methods and data formats used in the Java proxy to the Java script filenames and Java script function parameters used in the Java script proxy.

8. The method of claim 4, the method further comprising:

registering a frontend call function of the Java script running on the frontend layer with a registered Java service of the enterprise connector, including generating a backend method for the frontend call function;

wrapping the backend method for invocation by the backend function module via a gateway between the backend layer and the enterprise connector; and responsive to an invocation of the backend method via the gateway:

converting backend data received from the backend function module to frontend data, and initiating the frontend call function on the frontend layer via the registered Java service using the converted frontend data.

9. The method of claim 8, wherein wrapping the backend method for the frontend call function is performed using a reverse AJAX engine and initiating the frontend call function on the frontend layer via the registered Java service is performed via the DWR mechanism.

10. A machine-readable non-transitory storage medium having instructions stored therein, which when executed by a machine, cause the machine to perform a method for facilitating communications between a frontend layer and a backend layer of an enterprise computing system, the method comprising:
creating a Java proxy in the enterprise connector, the Java proxy facilitating a Java connector interface between the enterprise connector and the backend layer, the Java proxy containing a frontend method for a remote function call (RFC) to a backend function module;
wrapping the frontend method for the RFC for invocation by a Java script proxy for a Java script running in the frontend layer via direct communication between the Java script proxy and the Java proxy using direct web remoting (DWR) configured to support wrapping in accordance with a DWR configuration file, the DWR configuration file having a create tag and one or more convert tags, the create and convert tags instructing the DWR mechanism to:
cause the enterprise connector to create Java beans for the Java proxy,
convert methods of the Java beans to Java Script proxy using Java Script file names,
convert Java beans objects to JavaScript data format as function parameters of the JavaScript proxy; and
responsive to an invocation of the frontend method for the RFC by the Java script proxy using the Java script file names and function parameters, performing, in the enterprise connector:
generating the DWR configuration file for the RFC for which the frontend method was invoked, the DWR configuration file to specify the Java beans in the RFC for which the Java script proxy and Java proxy are to be generated using the DWR mechanism, and
converting frontend data received by the Java proxy from the JavaScript proxy from Java beans data format to backend data formatted in accordance with the DWR configuration file, DWR mechanism and backend function module data types, and initiating, via the Java proxy, the RFC to the backend function module on the backend layer using the converted backend data without exposing the Java connector interface to the frontend layer.

11. The medium of claim 10, wherein wrapping the frontend method for the RFC is performed using Asynchronous JavaScript and Extended Markup Language (AJAX).

12. The medium of claim 10, wherein responsive to the invocation of the frontend method, the method further comprises:
responsive to the backend layer initiating a return to the Java proxy from the RFC to the backend function module performing, in the enterprise connector,
converting backend data returned from the backend function module formatted in accordance with backend function module data types to Java proxy data format; and
relaying the converted data in Java proxy data format from the Java proxy to the Java script proxy.

13. The medium of claim 12, wherein relaying the converted frontend data in Java proxy data format from the Java proxy to the Java script proxy in Java script proxy format is performed using a reverse AJAX engine and DWR mechanism to manage converting the Java beans methods and data formats used in the Java proxy to the Java script filenames and Java script function parameters used in the Java script proxy.

14. The medium of claim 10, the method further comprising:
registering a frontend call function of the Java script running on the frontend layer with a registered Java service of the enterprise connector, including generating a backend method for the frontend call function;
wrapping the backend method for invocation by the backend function module via a gateway between the backend layer and the enterprise connector; and
responsive to an invocation of the backend method via the gateway:
converting backend data received from the backend function module to frontend data, and
initiating the frontend call function on the frontend layer via the registered Java service using the converted frontend data.

15. The medium of claim 14, wherein wrapping the backend method for the frontend call function is performed using a reverse AJAX engine and initiating the frontend call function on the frontend layer via the registered Java service is performed via the DWR mechanism.

\* \* \* \* \*